Nov. 8, 1960  M. VYŠANSKÝ  2,959,081
YIELDABLE CLAMP FOR PELT CUTTING DEVICE
Filed Dec. 27, 1956  2 Sheets-Sheet 1
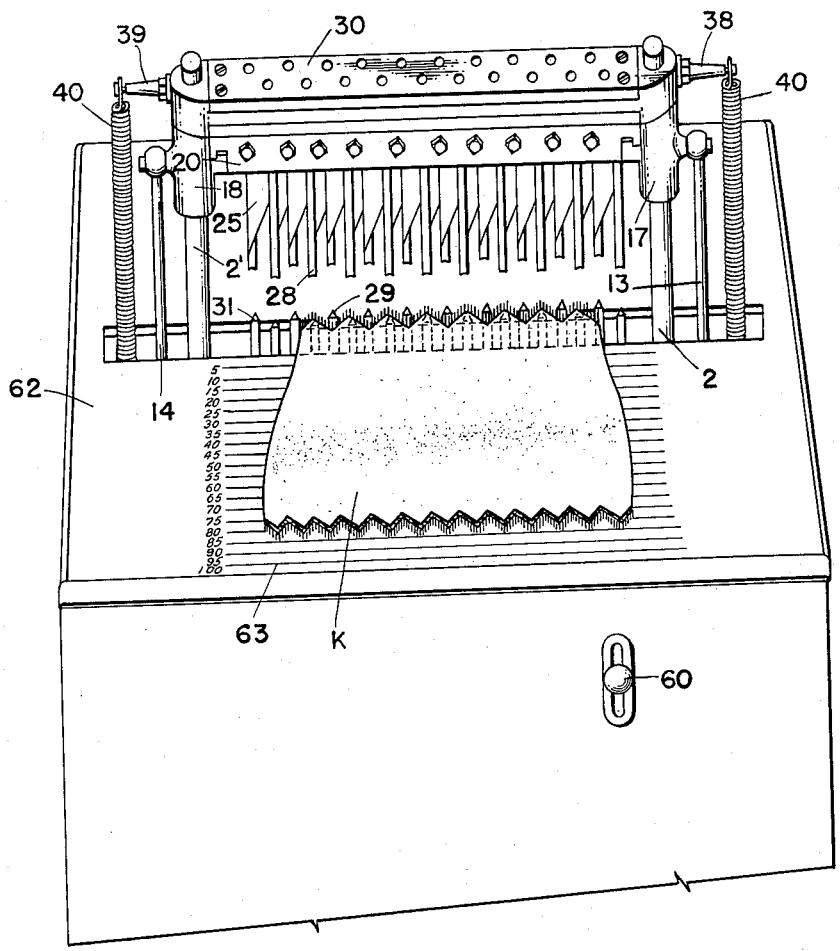
FIG.I.
INVENTOR
MILOŠ VYŠANSKÝ
BY Nov. 8, 1960    M. VYŠANSKÝ    2,959,081
YIELDABLE CLAMP FOR PELT CUTTING DEVICE
Filed Dec. 27, 1956    2 Sheets-Sheet 2
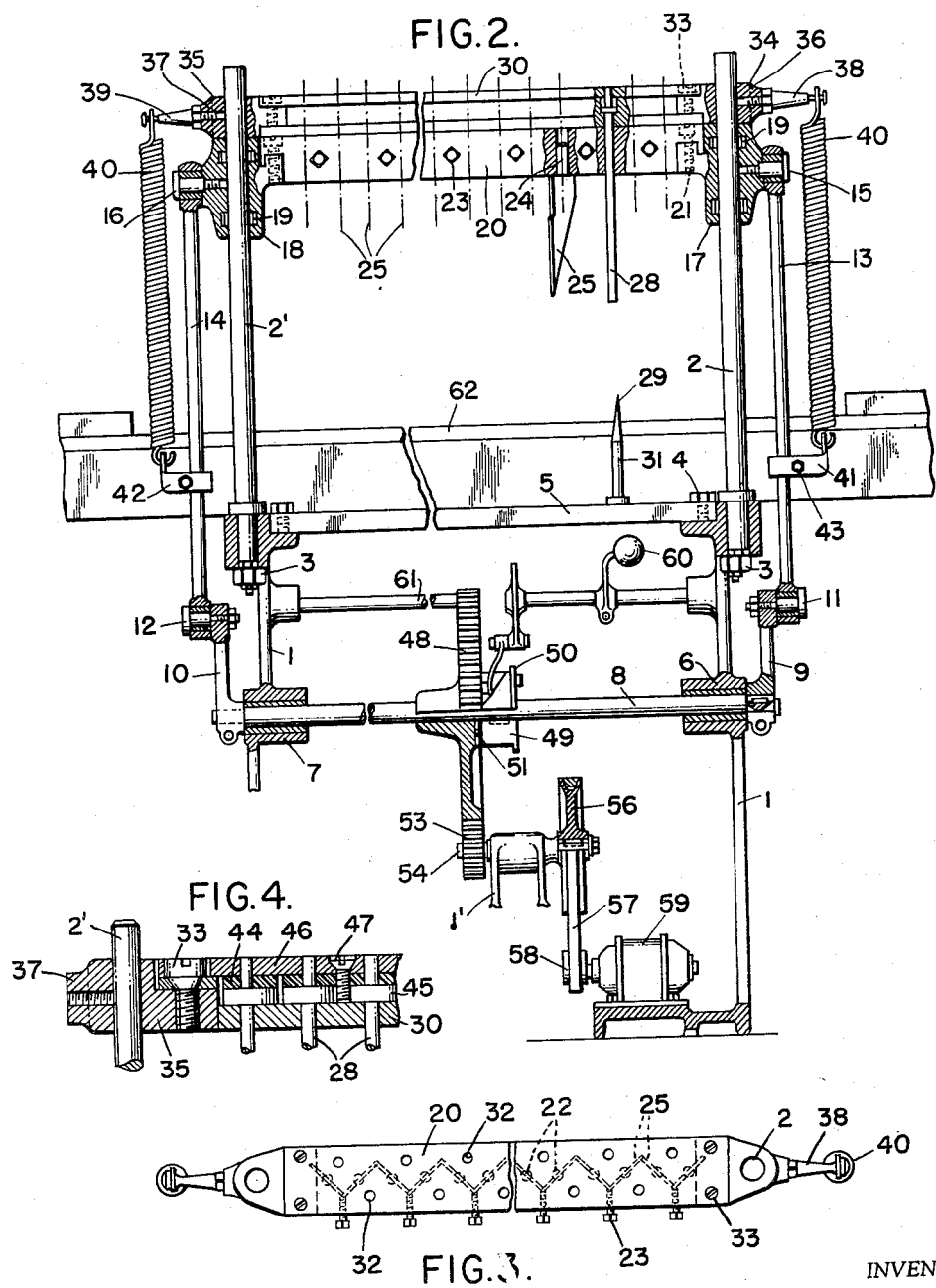
INVENTOR
MILOŠ VYŠANSKÝ
BY

United States Patent Office 2,959,081
Patented Nov. 8, 1960

2,959,081

YIELDABLE CLAMP FOR PELT CUTTING DEVICE

Miloš Vyšanský, Cerveny Kostelec, Czechoslovakia, assignor to Kara, národní podnik, Trutnov-Porici, Czechoslovakia Filed Dec. 27, 1956, Ser. No. 630,965

Claims priority, application Czechoslovakia Feb. 27, 1956

4 Claims. (Cl. 83—386)

This invention relates to a machine for cutting skins to permit them to be sewn together in the manufacture of peltry.

The invention is especially concerned with a machine for cutting the edges of skins in complemental shapes (e.g. in the shape of saw teeth) prior to arranging and sewing them together by means of a series of wedge-like knives for cutting out only the flesh part of the skins.

Hitherto, in the manufacture of peltry the skins have been cut out by hand. For this purpose stencils have been used having saw-like rims, the stencil being laid along the edge or rim of the flesh side of the skin to be cut and the contour of its toothed rim is marked on the edge or rim by, for example, powdered chalk. On the flesh or pelt side of the skin, the teeth-like design thus traced is cut out by a skilled worker so as to avoid damaging the hair or fur of the skin.

The drawbacks of such manual cutting of the skins is that output is small and the operation requires the employment of a considerable number of skilled workers, since the cutting requires a high degree of dexterity, attention and precision without being adequately productive.

It has, therefore, been proposed to provide a machine to effect this cutting operation efficiently and accurately and also to increase the output and improve the quality of the finished product. Such prior proposals have, however, resulted in rather complicated machines which present a number of drawbacks. For instance, it is necessary to use a much larger size of skin to permit the skin to be held in position during cutting with the result that a considerable portion of the useful surface of the skin, which may be valuable, is spoiled and rendered nonusable for further production, whereby considerable economical losses are incurred. Moreover, the shape and arrangement of the expensive tooth-like knives used in these prior proposals for cutting skins make re-grinding of the blunted edges, when necessary, practically impossible.

It is an object of the present invention to obviate or mitigate the aforesaid disadvantages and drawbacks.

The invention relates to a machine for pinking skins, especially the edges thereof, prior to arranging and sewing them together in the manufacture of pelting, the machine comprising means for engaging the underside of a skin at longitudinally-spaced locations, means for engaging the upperside of the skin at said longitudinally-spaced locations, means for pinking the skin between said longitudinally-spaced locations, and means for moving the upper engaging and the pinking means to-and-from the lower engaging means in such a manner that the upper engaging means abuts the lower engaging means before the pinking means contacts the skin.

More particularly, a machine embodying the invention for cutting or pinking skins, especially the edges thereof, prior to arranging and sewing them together in the manufacture of peltry, comprises a table on which a skin to be cut or pinked is laid flesh side uppermost, a series of upright, longitudinally spaced piercers mounted on the table for receiving the edge of the skin to be pinked, a series of longitudinally spaced pressure pins corresponding in number to the piercers and arranged directly above the latter, a series of wedge-like knives arranged between the piercers, and means for moving the pins and knives to-and-from the piercers in such a manner that the pins abut the piercers before the knives contact the skin.

The present invention, therefore, provides a very substantial improvement of the operations concerned with the cutting of skins prior to arranging and sewing them together in the manufacture of peltry. Moreover, the machine is of simple construction and makes these operations easier, more accurate and results in a higher quality of product, thus increasing essentially the productivity of the work and eliminating at the same time the loss of valuable material hitherto wasted.

An embodiment of the invention will now be described by way of example with reference to the accompanying drawings, wherein:

Fig. 1 is a perspective view of the top part of the machine.

Fig. 2 is a diagrammatic, part-sectional elevation of the movable components of the machine;

Fig. 3 is a plan view on the knife-carrying frame of the machine; and

Fig. 4 is a fragmentary sectional view of the carrier and clamping pressure pins of the machine.

Referring to the drawings in detail, it will be seen that a machine embodying the invention comprises a frame 1, within which uprights 2, 2' are fixedly secured by nuts 3 and between which a plate 5 is fixed by bolts 4. A shaft 8 is mounted in a rotatable manner in bearings 6, 7, mounted on the machine frame 1, and levers 9, 10 are fixed on the ends of shaft 8. The ends of the levers 9, 10 are attached to the lower ends connecting rods 13, 14 through pivot connections 11, 12. The upper ends of the connecting rods 13, 14 remote from the pivot connections are supported pivotally on pins 15, 16 screwed into the bearings 17, 18 provided with lubricating rings 19.

The bearings 17, 18 are fixedly connected by means of bolts 21 to a knife-carrying frame 20, but are slidable along the uprights 2, 2'. The frame 20 is provided with a series of apertures 22 (Fig. 3) for inserting therein in staggered relationship the cylindrical shanks 24 of wedge-like knives 25 (Figs. 2 and 3). The wedge-like knives 25 are secured in position by set screws or bolts 23 engaging the shanks 24 (Fig. 3).

A carrier 30 is located above the frame 20 and carries pressing pins 28 directed towards the points 29 of piercers 31 located on te plate 5 (Fig. 2), arranged in a rectangular opening of the top face 62 of the working table of the machine. The frame 20 is formed with apertures 32 arranged, as can be seen in Fig. 3 to receive the pins 28. The ends of the carrier 30 are rigidly connected by means of bolts 33 to bearings 34, 35 slidably mounted on the uprights 2, 2'. The outer ends of the bearings 34, 35 are formed as lugs 36, 37, in which holders 38, 39 for vertically-arranged springs 40 are threadedly engaged. The opposite or lower ends of these springs 40 are secured to holders 41 and 42 which are rigidly connected by means of screws 43 to the connecting rods 13, 14. The top portions of the pressure pins 28 are formed with integral peripheral shoulders 45 having a larger diameter than that of the pins. These shoulders 45 are located between the inner bearing face of the carrier 30 and, resilient blocks 44 held in position as can be seen in Fig. 4, by the carrier top 46 which is maintained in position by bolts 47.

A fixed member 49 of a single-revolution coupling 50 is mounted on the shaft 8, while a free member 51 of that coupling is formed by the flange of a driven gear wheel 48. The gear wheel 48 meshes with a gear wheel 53 keyed on a shaft 54 which also carries a belt pulley 56 to form a reduction gear for the working components of the machine. The belt pulley 56 is driven by an electric motor 59 through a belt 57 and belt pulley 58 carried by the motor shaft. It is to be noted that instead of an electric motor a pneumatic or hydraulic driving means may be provided.

The single-revolution coupling 50 is actuated by a handlever 60 mounted on a shaft 61 supported in the frame 1 of the machine.

The above-described machine functions as follows:

The operator positions one edge or rim of a skin K, which edge or rim is to be pinked with the flesh/pelt/side turned upwards on the points 29 of the piercers 31 in such a way as to reduce as much as possible the waste which may occur after cutting. The operator holds down the skin K on the piercers 31 and then actuates the handlever 60 to engage the single revolution coupling 50 and so actuate the moving components of the machine. It is to be noted that instead of manually-controlling the operation of the coupling, the later may be controlled by any other suitable means, for example, a toggle lever, pedal or electric switch without departing from the scope of the accompanying claims.

When the coupling 50 is engaged, the shaft 8 is immediately rotated and the levers 9, 10 keyed thereon are, therefore, also pivoted, thus imparting movement to the connecting rods 13, 14, tensioning the springs 40, and causing the frame 20 together with the wedge-like knives 25 to slide down the uprights 2, 2'. The carrier 30 with the pressure pins 28 is simultaneously drawn downwards due to the force of the tensioned springs 40. Due to the springs 40 the pressure pins 28 on their downward movement abut the points 29 of the piercers 31 before the wedge-like knives 25 reach the cutting zone and so the skin K is stretched and held down. After the abutment of the pressure pins 28 on the piercers 31, the springs 40 are still further tensioned due to the continued pivoting movement of the levers 9, 10. The points of the wedge-like knives 25 now penetrate the flesh side of the skin K, thus pinking it, i.e. shaping it as seen in Fig. 1. The wedge-like knives 25 merely cut into the flesh side of the skin, leaving the hair unaffected, since they glide off throughout the hair length owing to the fact that the skin lies with its hair side on the piercers 31 only to such an extent that the edge of each knife 25 passes during the cutting action into space.

After the completion of the cutting or pinking the carrier 30 and the pressure pins 28 are lifted by the springs 40 into their original initial position together with the frame 20 and the wedge-like knives 25. The whole operation occurs during one revolution of the shaft 8 and the levers 9, 10.

The skin K is then removed, turned and laid with its opposite edge or rim on the piercers 31 and the entire operation as described above is repeated.

A scale 63 is provided on the table, as shown in Fig. 1 and serves to permit the required length of the skin K to be secured in position for the cutting or punching operation, thus, skins of equal length are obtained.

The machine according to the present invention is of simple construction, enables efficient and easy cutting of pinked edges or rims of skins and ensures an improved and more accurate cutting or punching operation, thus lessening substantially the waste losses, and so increasing productivity.

I claim:

1. A machine for pinking the edges of skins prior to sewing together such edges in the manufacture of peltry; said machine comprising a table on which a skin to be pinked can be laid with the flesh side thereof facing upward, a frame mounted above said table for vertical movement toward and away from the latter and carrying wedge-shaped knives arranged in alternately oppositely angled planes defining a saw-tooth cutting plane, said table having a generally rectangular opening therein positioned to underlie the edge of the skin to be pinked and dimensioned so as to loosely receive said knives when said frame is moved toward the table, a series of spaced apart upright piercers mounted in said opening in two staggered rows at the opposite sides of said cutting plane with only one piercer being disposed between each two adjacent knives, said piercers having pointed upper ends for engaging the underside of the skin laid on the table adjacent the edge to be pinked, a series of spaced apart upright pressure pins corresponding in number to said piercers and arranged directly above the latter, said pressure pins having blunt lower ends, said frame having openings through which said pins loosely extend, a carrier for said pins located above said frame and movable vertically toward and away from said table independently of said frame, and means for moving said frame and carrier toward and away from said table in such a manner that said blunt lower ends of the pins abut said pointed upper ends of the piercers to hold the skin therebetween only at spaced apart locations before said knives contact the skin between said spaced apart locations.

2. A machine as in claim 1; wherein each of said pins is vertically movable relative to said carrier; and further comprising resilient means individually positioning each of said pins relative to said carrier so as to ensure uniform contact between said pins and the related piercers.

3. A machine as in claim 1; wherein said carrier has a vertical bore therein for slidably receiving each of said pressure pins, each of said pins having an enlarged shoulder, a resilient block above said shoulder of each pressure pin, and a cover on said carrier engaging the resilient blocks from above so that the latter individually position the related pressure pins relative to said carrier and can yield to ensure uniform contact between said pins and the related piercers.

4. A machine as in claim 1; wherein said table has a scale thereon for indicating the length of a skin on the table to the edge of the skin to be pinked.

References Cited in the file of this patent
UNITED STATES PATENTS

| | | |
|---|---|---|
| 536,016 | Childs | Mar. 19, 1895 |
| 608,725 | Stark | Aug. 9, 1898 |
| 1,357,727 | Roach | Nov. 2, 1920 |
| 1,660,387 | Masel | Feb. 28, 1928 |
| 1,736,143 | Townsend | Nov. 19, 1929 |
| 2,038,857 | Rutter et al. | Apr. 28, 1936 |
| 2,747,664 | Corson | May 29, 1956 |

FOREIGN PATENTS

| | | |
|---|---|---|
| 504,410 | Germany | Aug. 12, 1930 |